United States Patent
Hosomizo

(10) Patent No.: US 11,068,760 B2
(45) Date of Patent: Jul. 20, 2021

(54) TERMINAL DEVICE HAVING COMMUNICATION INTERFACE CONFIGURED TO COMMUNICATE WITH PRINTER, AND NON-TRANSITORY COMPUTER-READABLE RECORDING MEDIUM CONTAINING INSTRUCTIONS THEREFOR

(71) Applicant: BROTHER KOGYO KABUSHIKI KAISHA, Nagoya (JP)

(72) Inventor: Yoshito Hosomizo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/565,694

(22) Filed: Sep. 10, 2019

(65) Prior Publication Data

US 2020/0202186 A1    Jun. 25, 2020

(30) Foreign Application Priority Data

Dec. 24, 2018    (JP) .............................. JP2018-240412

(51) Int. Cl.
*G06K 15/02*    (2006.01)
*G06K 15/12*    (2006.01)

(52) U.S. Cl.
CPC ......... *G06K 15/1809* (2013.01); *G06K 15/12* (2013.01)

(58) Field of Classification Search
CPC combination set(s) only.
See application file for complete search history.

(56) References Cited

U.S. PATENT DOCUMENTS

2010/0003046 A1*    1/2010    Tsujita ............... G03G 15/5087
                                                          399/82
2010/0060919 A1*    3/2010    Tanaka .................. G06F 40/103
                                                          358/1.9

FOREIGN PATENT DOCUMENTS

JP    2006-011120 A    1/2006

* cited by examiner

*Primary Examiner* — Helen Zong
(74) *Attorney, Agent, or Firm* — Scully, Scott, Murphy & Presser, P.C.

(57) ABSTRACT

A non-transitory computer-readable recording medium stores computer-executable instructions, which constitute a particular program, for a terminal device. The instructions cause, when executed by the controller, the terminal device to perform obtaining printable area information indicating a printable area on a printing medium loaded to the printer, outputting a command instructing printing of a first image to the printer, determining whether a shortening condition is satisfied, a period for the short-time printing process is shorter than that for a normal printing process. When it is determined that the shortening condition is not satisfied, the controller outputs a first command causing the printer to print the first image within a normal printable area on the printing medium. When it is determined that the shortening condition is satisfied, the controller outputs a second command causing the printer to print the first image within a reduced area which is smaller than the printable area.

12 Claims, 8 Drawing Sheets

TERMINAL DEVICE HAVING COMMUNICATION INTERFACE CONFIGURED TO COMMUNICATE WITH PRINTER, AND NON-TRANSITORY COMPUTER-READABLE RECORDING MEDIUM CONTAINING INSTRUCTIONS THEREFOR

CROSS-REFERENCE TO RELATED APPLICATIONS

This application claims priority under 35 U.S.C. § 119 from Japanese Patent Application No. 2018-240412 filed on Dec. 24, 2018. The entire subject matter of the application is incorporated herein by reference.

BACKGROUND

Technical Field

The present disclosures relate to a terminal device configured to communicate with a printer, and a non-transitory computer-readable recording medium containing instructions for such a terminal device.

Related Art

There has been known a conventional printer configured such that images are printed on conveyed printing sheets by transferring toner onto the conveyed printing sheets and applying heat by a heating section. In such a conventional printer including the heating section, conveyance of the printing sheets is typically started after the heating section have been heated to a certain degree.

SUMMARY

In the conventional printer mentioned above, conveyance of the printing sheets is not started until a temperature of the heating section reaches a particular temperature, thereby loss of time being caused.

According to aspects of the present disclosures, there is provided a non-transitory computer-readable recording medium storing computer-executable instructions, which constitute a particular program, for a terminal device having a communication interface and a controller. The instructions cause, when executed by the controller, the terminal device to perform a first obtaining process of obtaining printable area information indicating a normal printable area, by a printer connected with the communication interface, on a printing medium loaded to the printer, a command outputting process of outputting a command instructing printing of a first image on the printing medium loaded to the printer connected with the communication interface, and a condition deter mining process of determining whether a shortening condition is satisfied, transmission of a command to perform a short-time printing process to the printer connected with the communication interface being permitted when the shortening condition is satisfied, the short-time printing process being a printing process in which a time period necessary for completing the printing process is shorter than a normal printing process. When it is determined that the shortening condition is not satisfied, the controller outputs, in the command outputting process, a first command, the first command causing the printer to print the first image within the normal printable area, on the printing medium, indicated by the printable area information obtained in the first obtaining process. Further, when it is determined that the shortening condition is satisfied, the controller outputs, in the command outputting process, a second command, the second command including the instruction to perform the short-time printing process transmitted from the terminal device to the printer and causing the printer to print the first image within a reduced area on the printing medium, the reduced area being smaller than the normal printable area indicated by the printable area information obtained in the first obtaining process.

According to aspects of the present disclosures, there is provided terminal device including a communication interface and a controller. In accordance with a particular program, the controller is configured to perform a first obtaining process of obtaining printable area information indicating a normal printable area, by a printer connected with the communication interface, on a printing medium loaded to the printer, a command outputting process of outputting a command instructing printing of a first image on the printing medium loaded to the printer, and a condition deter mining process of determining whether a shortening condition is satisfied, transmission of a command to perform a short-time printing process to the printer connected with the communication interface being permitted when the shortening condition is satisfied, the short-time printing process being a printing process in which a time period necessary for completing the printing process is shorter than a normal printing process. When it is determined that the shortening condition is not satisfied, the controller outputs, in the command outputting process, a first command, the first command causing the printer to print the first image within a normal printable area, on the printing medium, indicated by the printable area information obtained in the first obtaining process. Further, when it is determined that the shortening condition is satisfied, the controller outputs, in the command outputting process, a second command, the second command the second command including the instruction to perform the short-time printing process to be transmitted from the terminal device to the printer and causing the printer to print the first image within a reduced area on the printing medium, the reduced area being smaller than the normal printable area indicated by the printable area information obtained in the first obtaining process.

According to aspects of the present disclosures, there is provided communication system including a terminal device and a printer. The terminal device includes a communication interface and a controller, and the printer is connected with the communication interface. In accordance with a particular program, the controller is configured to perform a first obtaining process of obtaining printable area information indicating a printable area, by the printer, on a printing medium loaded to the printer, a command outputting process of outputting a command instructing printing of a first image on the printing medium loaded to the printer, and a condition determining process of determining whether a shortening condition is satisfied, transmission of a command to perform a short-time printing process to the printer connected with the communication interface being permitted when the shortening condition is satisfied, the short-time printing process being a printing process in which a time period necessary for completing the printing process is shorter than a normal printing process. When it is determined that the shortening condition is not satisfied, the controller outputs, in the command outputting process, a command requesting for a first image having a size which can be settled within the printable area indicated by the printable area information obtained in the first obtaining process to the particular program as the first command. Further, when the shortening condition is satisfied, the controller outputs, in the command outputting process, a command including the instruction to perform the short-time printing process to be transmitted from the terminal device to the printer and requesting for the first image having a size which can be settled within an area smaller than the printable area to the external program as the second command. The controller is further configured to perform a first generating process of obtaining image data of the first image corresponding to the command output in the command outputting process and generates the printing image data based on the obtained image data and a first transmitting process of transmitting a print instruction to print an image represented by the printing image data generated in the first generating process to the printer through the communication interface.

According to aspects of the present disclosures, there is provided a communication system provided with a terminal device and a printer. The terminal device includes a communication interface and a controller, and the printer is connected with the communication interface. The controller is configured to perform a first obtaining process of obtaining printable area information indicating a printable area, by the printer, on a printing medium loaded to the printer, a requesting process of requesting an application for a first image to be printed on the recording medium and having a size which can be settled within the printable area indicated by the printable area information obtained in the first obtaining process, and, in response to a request in the requesting process, a second generating process of obtaining image data of the first image from the application and generating the printing image data based on the obtained image data and a second transmitting process of transmitting a command instruction printing of an image represented by the printing image data generated in the second generating process to the printer through the communication interface. In the second transmitting process, when the shortening condition regarding shortening of a time period necessary to complete a printing process by the printer is not satisfied, the controller transmits a first command instructing printing of an image represented by the printing image data generated in the second generating process within the printable area on the printing medium to the printer through the communication interface, while when the shortening condition is satisfied, the controller transmits a second command instructing printing of an image represented by the printing image data generated in the second generating process, in a reduced manner, within an area smaller than the printable area on the printing medium to the printer through the communication interface.

BRIEF DESCRIPTION OF THE ACCOMPANYING DRAWINGS

FIGS. 7A-7D respectively show flowcharts of the printer driver.

DETAILED DESCRIPTION OF THE EMBODIMENT

Figure 1:
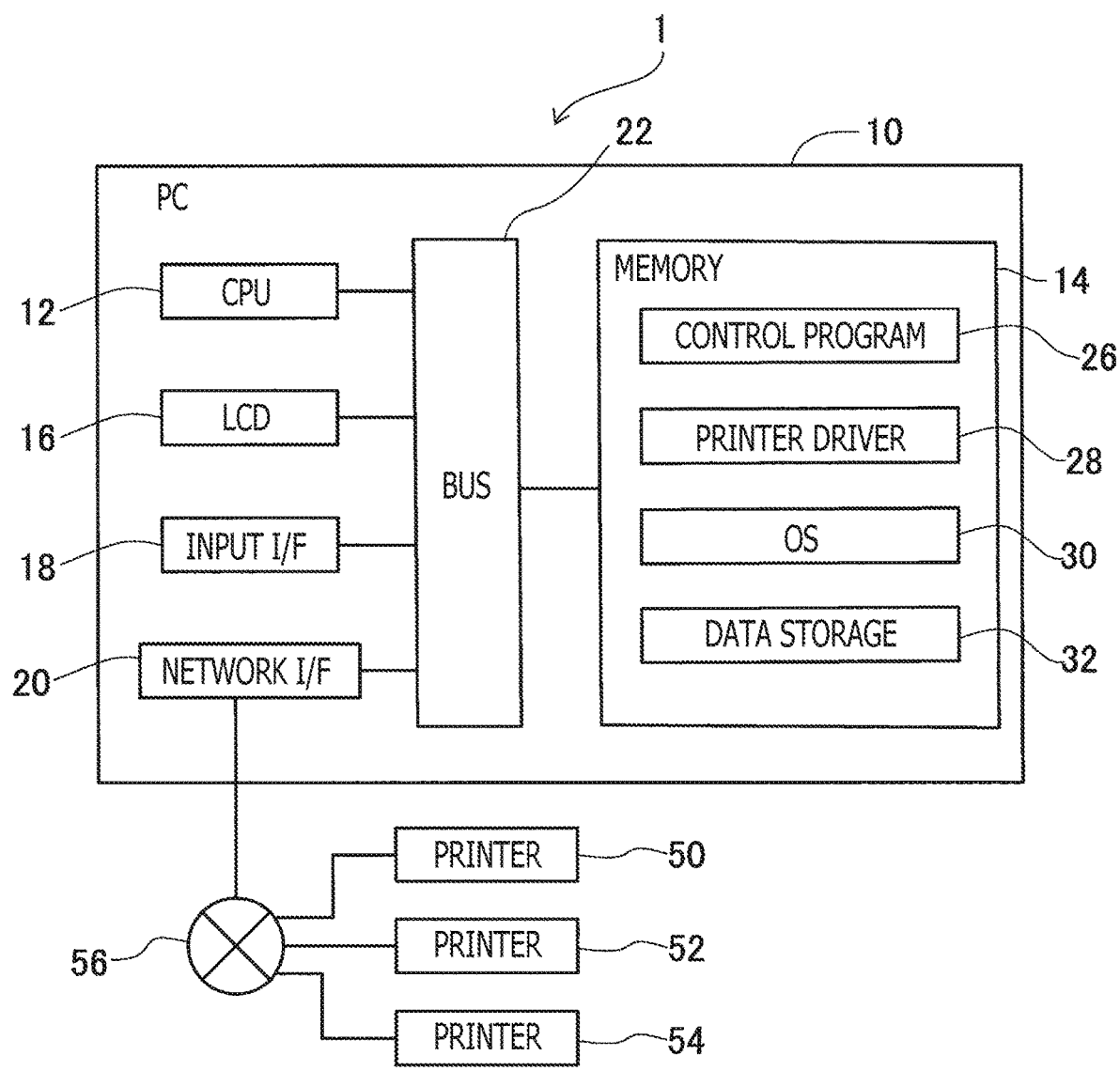
FIG. 1 is a block diagram of a communication system 1 according to an illustrative embodiment of the present disclosures.

FIG. 1 is a block diagram showing a communication system 1 according to an embodiment of the present disclosures. The communication system 1 is provided with a PC (which is an example of a terminal device) 10, printers 50, 52 and 54.

The PC 10 mainly includes a CPU (which is an example of a processor) 12, a memory 14, an LCD 16, an input I/F (which is an example of a user interface) 18 and a network I/F (which is an example of a communication I/F) 20, which are configured to communicate with each other through a bus 22.

The PC 10 is communicatable with each of the printers 50, 52 and 54 through the network I/F 20 and the network 56. As a communication method, a wired LAN, a USB, Wi-Fi® and/or Bluetooth® may be employed.

Each of the printers 50, 52 and 54 is a laser printer which is configured to print images on A4 size (i.e., 210 mm×297 mm) printing sheets (which are examples of a printing medium). The laser printer is configured such that a charged photosensitive drum is exposed to a modulated laser beam, thereby an electrostatic latent image being formed thereon. Then, toner is adhered to the photosensitive drum on which the latent image is formed, thereby a toner image is formed on the photosensitive drum. The toner image is transferred onto the printing sheet which is conveyed inside a body of the laser printer. Thereafter, heat is applied to the transferred toner by a fixing device, thereby the toner image is permanently fixed onto the printing sheet. According to the illustrative embodiment, the fixing device has a fixing roller 60a or a fixing roller 60b (see FIGS. 2A-5). At a central portion of the fixing roller 60a or 60b, in an axial direction thereof, a heater (which is an example of a heating part) 62a or 62b (see FIGS. 2A-5) is arranged. According to such a configuration, the heat and a pressure are applied to the toner image transferred onto the printing sheet 70 by the fixing roller 60a or 60b, and the transferred toner is fixed onto the printing sheet 70 by thermal compression. In the following description, the heater 62a of the fixing roller 60a or the heater 62b of the fixing roller 60b may collectively be referred to as a heater 62 of a fixing roller 60.

Figure 2A:
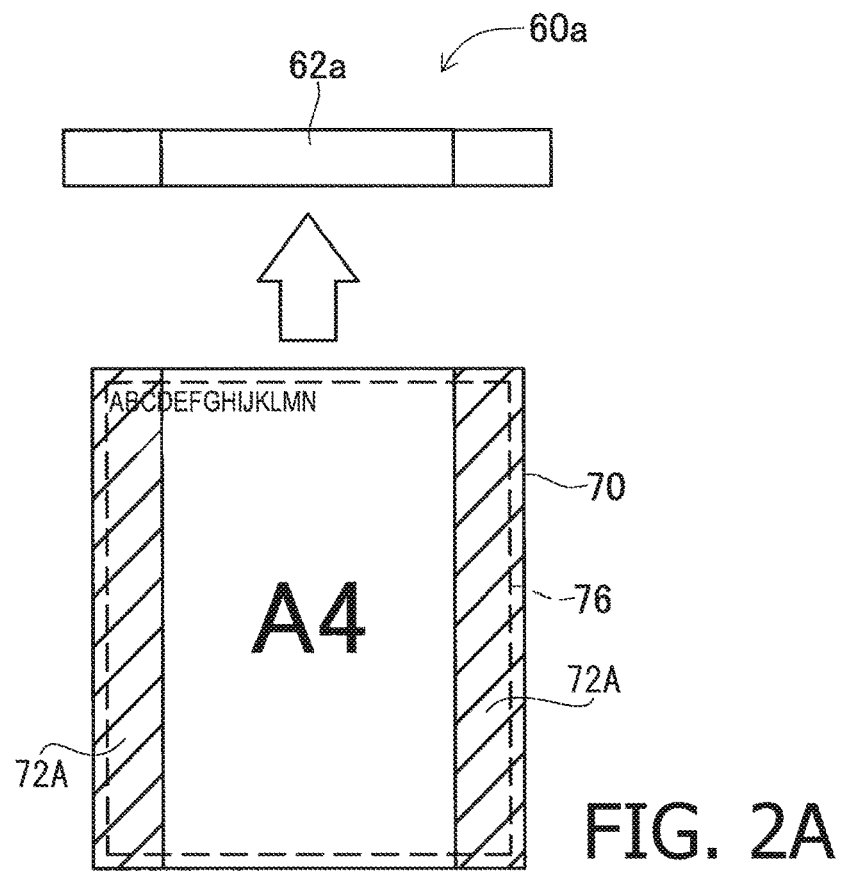
FIG. 2A shows a normal printable area on a printing sheet.

It is noted that, in each of FIGS. 2A-5, a conveying direction of the printing sheet 70 is indicated by an arrow. In the printer 50, the A4 size printing sheet 70 is conveyed in a direction along a longitudinal direction of the printing sheet 70 as shown in FIG. 2A. In the printer 52, the A4 size printing sheet 70 is conveyed in a direction along a direction perpendicular to the longitudinal direction (i.e., a direction along the shorter side) of the printing sheet 70 as shown in FIG. 2B. Therefore, a length, in the axial direction, of a fixing roller 60a of the printer 50 is longer than a length of the shorter side of the printing sheet 70 as shown in FIG. 2A. Regarding the printer 52, a length, in the axial direction, of a fixing roller 60b is longer than a length of the longer side of the printing sheet 70 as shown in FIG. 2B.

The CPU 12 performs processes in accordance with a control program 26, a printer driver (an example of a program) 28 and an OS (an example of an external program and application) 30 stored in a memory 14. The control program 26 is a program configured to create image data and output the created image data to the printer driver 28 through the OS 30. The control program 26 may be configured to display an editing screen, which allows a user to edit an image, on the LCD 16. The control program 26 may be configured to generate image data indicating the image that has been edited in accordance with a user operation through the input I/F 18. The printer driver 28 is a device driver for the printers 50 and 52 and controls, when executed by the CPU 12, operations of the printers 50 and 52. The OS 30 is a program providing basic functions which are utilized by the control program 26 and the printer driver 28. It is noted that, in the following description, the CPU 12 executing the printer driver 28 may be referred to by the name of the program (i.e., the printer driver 28). For example, an expression "the printer driver 28 performs . . . " is used to mean "the CPU 12 executing the printer driver 28 performs . . . ."

The memory 14 has a data storage area 32. The data storage area 32 is an area for storing data which is necessary when the printer driver 28 is executed. It is noted that the memory 14 is configured by a combination of a RAM, a ROM, a flash memory, an HDD, a buffer provided to the CPU 12 and the like.

The memory 14 may be a computer-readable storage medium. The computer-readable storage medium is a non-transitory medium. Examples of the non-transitory medium are, besides the above-described memory 14, recording medium such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The LCD 16 is configured to display various pieces of information regarding the PC 10. It is noted that the display need not be limited to the LCD, but other types of displays (e.g., an organic EL display) may be employed. The input I/F 18 is an interface through which user operations are input. The input I/F 18 includes keyboard, a mouse and the like. The input I/F 18 may be a touch panel integrally provided onto a displaying surface of the LCD 16.

In the specification, processes of the CPU 12 according to the instructions described in programs will be mainly described. That is, processes to "judge," "extract," "select," "calculate," "determine," "identify," "specify," "obtain," "receive," "control" and the like are those performed by the CPU 12. It is noted that the processes performed by the CPU 12 may include control of hardware through the OS 30. It is also noted that the term "obtain" is used to mean a concept which does not necessarily include a concept of requesting. That is, a process of the CPU 12 to receive data without requesting therefor is also included in a concept that "the CPU 12 obtains data." Further, a term "data" in the specification is represented by a computer-readable bit array. A plurality of pieces of data having substantially the same meaning but different formats will be treated as the same data. A term "information" used in the specification will be treated in the same manner. Further, the processes of "instruct", "respond" and "request" are executed by communicating information indicating "instruct", "respond" and "request", respectively. Further, a process of "set" is executed by storing input setting information to a memory.

In the communication system 1 configured as above, the image data created by the control program 26 is output to the printer driver 28 through the OS 30. When receiving the image data, the printer driver 28 creates printing image data (i.e., image data for printing) based on the received image data, and transmits the created printing image data to the printer 50, 52 and/or 54, thereby a printing process being performed by the printer 50, 52 and/or 54 based on the printing image data.

As described above, both the printers 50, 52 and 54 are laser printers, when a printing process is started, conveyance of the printing sheets 70 is started after the heater 62 of the fixing roller 60 is heated for a particular period of time, and the printing process of printing an image on the conveying printing sheet 70 is performed. It is noted that the heater 62 is heated in advance for the particular period of time since, if the fixing roller 60 is not sufficiently heated, the toner transferred on the printing sheet cannot be well fixed and it is not guaranteed that an image is appropriately printed on the printing sheet 70. In particular, according to the configurations of the printers 50, 52 and 54 (see FIGS. 2A-5), the heater 62 is arranged at a central portion, in the axial direction, of the fixing roller 60, but does not extend to end portions of the fixing roller 60. Because of this configuration, in order to have both end portions of the fixing roller 60, in the axial direction, sufficiently heated before the conveyance of the printing sheet 70 is started, the fixing roller 60 is heated, without conveying the printing sheet 70, for a particular period (which will be referred to as X seconds). According to the above control, the both end portions of the fixing roller 60 as well as the central portion thereof, in the axial direction, can be sufficiently heated, and it is guaranteed that the toner image transferred onto the printing sheet 70 is permanently fixed thereon.

It is noted that a time period necessary for completing a printing operation has been desired to be shortened. For this purpose, for example, when no images are printed on side areas, which may not be well heated by the heater 62, of the printing sheet, conveyance of the printing sheet may be started even if portions of the fixing roller 60 corresponding to the side areas of the printing sheet 70 are not sufficiently heated. That is, when there are no images to be printed on side areas of the printing sheet 70, conveyance of the printing sheet can be started after heating the fixing roller 60 for a shorter time period (e.g., Y seconds) which is shorter than a particular time period (e.g., X seconds). According to such a configuration, in comparison with a case where conveyance of the printing sheet is started after applying heat to the fixing roller 60 for X seconds, conveyance of the printing sheet can be started earlier, and accordingly, an entire time period for completing the printing process can be shortened.

For example, when the printing sheet 70 is conveyed in a portrait orientation (i.e., the conveying direction coincides with the longitudinal direction of the printing sheet 70) as shown in FIG. 2A, both end areas, in a direction perpendicular to the longitudinal direction, of the printing sheet 70 (i.e., hatched portions 72A in FIG. 2A, which areas will be referred to as "portrait-orientation side areas" 72A) may not be heated well by the heater 62a. Therefore, when images are to be printed on the portrait-orientation side areas 72A of the printing sheet 70, conveyance of the printing sheet 70 should be started after the fixing roller 60 is heated by the heater 62 for X seconds so that the portrait-orientation side areas 72A are heated appropriately.

On the other hand, when no images are to be printed on the portrait-orientation side areas 72A, it is unnecessary to heat the portrait-orientation side areas 72A. Therefore, it is unnecessary to start conveying the printing sheet after heating the fixing roller 60 is heated by the heater 62 for X seconds. In other words, when there are not images to be printed on the portrait-orientation side areas 72A, it is sufficient to heat the fixing roller 60 for a time period (e.g., Y seconds) which is shorter than the particular time period. In such a case, the conveyance of the printing sheet 70 may be started after the fixing roller 60 is heated by the heater for Y seconds.

Figure 2B:
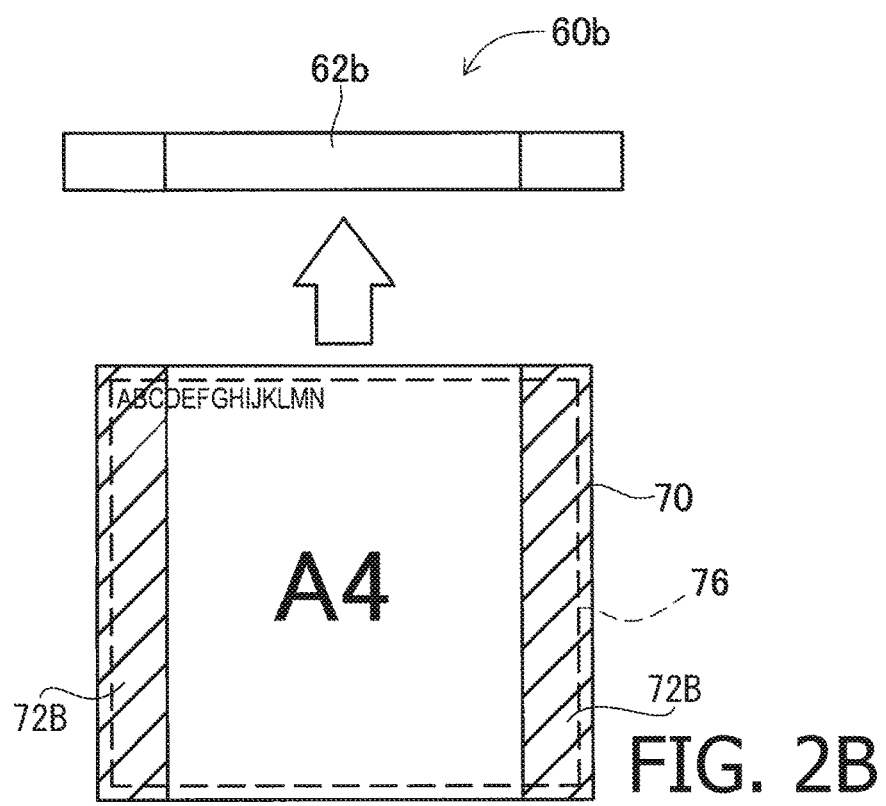
FIG. 2B shows a normal printable area on a printing sheet.

Further, as shown in FIG. 2B, when the printing sheet 70 is conveyed in a landscape orientation (i.e., when the longitudinal direction of the printing sheet 70 is perpendicular to the conveying direction), both side end portions of the printing sheet 70 in its longitudinal direction (i.e., hatched portions 72B in FIG. 2B: hereinafter, referred to as "landscape-orientation side areas" 72B) are not heated by the heater 62 easily. Therefore, similar to the portrait-orientation side areas 72A, when not images are to be printed on the landscape-orientation side areas 72B, conveyance of the printing sheet 70 may be started after the fixing roller 60 is heated by the heater 62 for a period (e.g., Y seconds) which is shorter than the particular period (e.g., X seconds). As above, when there are no images to be printed on the side areas 72 (i.e., the portrait-orientation side areas 72A or the landscape-orientation side areas 72B, which will also be collectively referred to as side areas 72), by starting conveyance of the printing sheet 70 earlier, the time period required for the printing process can be shortened. In order to shorten the time period required for the printing process according to the above method, however, it is necessary to analyze the image data to determine whether there are images to be printed on the side areas 72, and a time period for the analyzation is necessary. In the following description, the portrait-orientation side areas 72A and the landscape-orientation side areas 72B are collectively referred to as side areas 72.

Therefore, according to the illustrative embodiment, a printing process avoiding printing of images on the side areas 72A or 72B of the printing sheet 70 without analyzing the image data to determine whether there exist images to be printed on the side areas 72 is performed. That is, according to the illustrative embodiment, a process of printing images in an area other than the side areas 72A or 72B of the printing sheet 70. Specifically, the image will not be printed on an entire area of the printing sheet 70, but margins are set at peripheral portions of the printing sheet 70, and images are printed in an area (which will be referred to as "printable area") other than the margins of the printing sheet 70.

In the data storage 32, margin information (which is an example of printable area information) regarding the margins is stored, for example, at a time of installation of the printer driver 28. The printer driver 28 obtains the margin information from the data storage 32 and outputs the obtained margin information to the control program 26 through the OS 30. With this configuration, the control program 26 generates image data for printing the image within an area corresponding to the received margin information (i.e., within an area other than the margins indicated by the margin information). That is, the printer driver 28 outputs the margin information (hereinafter, referred to as "normal margin information") which normally defines the printable area to the control program 26. Then, the control program 26 generate image data (hereinafter, referred to as "normal image data") for printing an image within the thus defined printable area. It is noted that the normal margin information is set without taking the side areas mentioned above. Therefore, as shown in FIGS. 2A and 2B, a normal printable area 76 defined as above (i.e., defined based on the normal margin information) extends to overlap the side areas 72A or 72B. Therefore, when the printing process based on the normal image data is performed, the image data generated by the control program 26 may be printed in the side areas 72A or 72B.

Figure 3A:
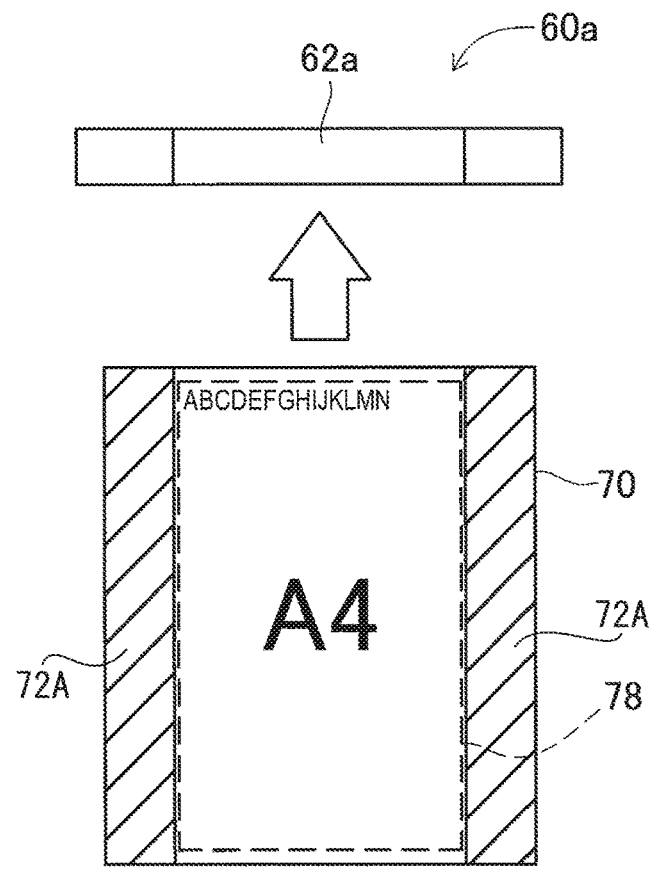
FIG. 3A shows a reduced printable area on the printing sheet.
Figure 3B:
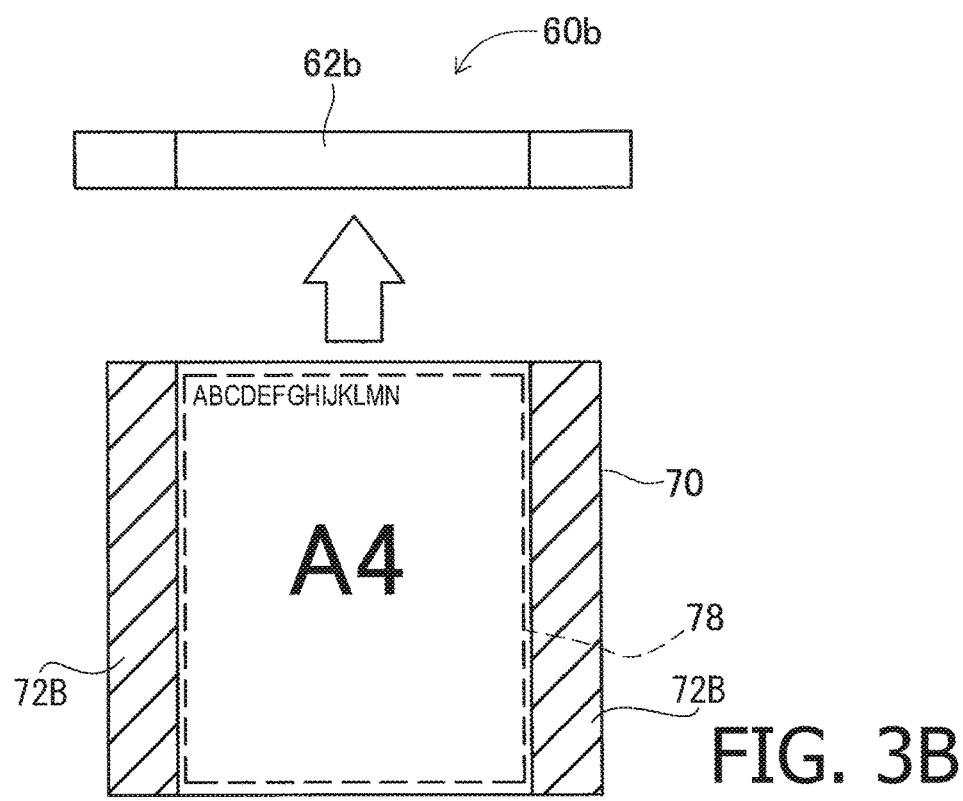
FIG. 3B shows a reduced printable area on the printing sheet.
Figure 7A:
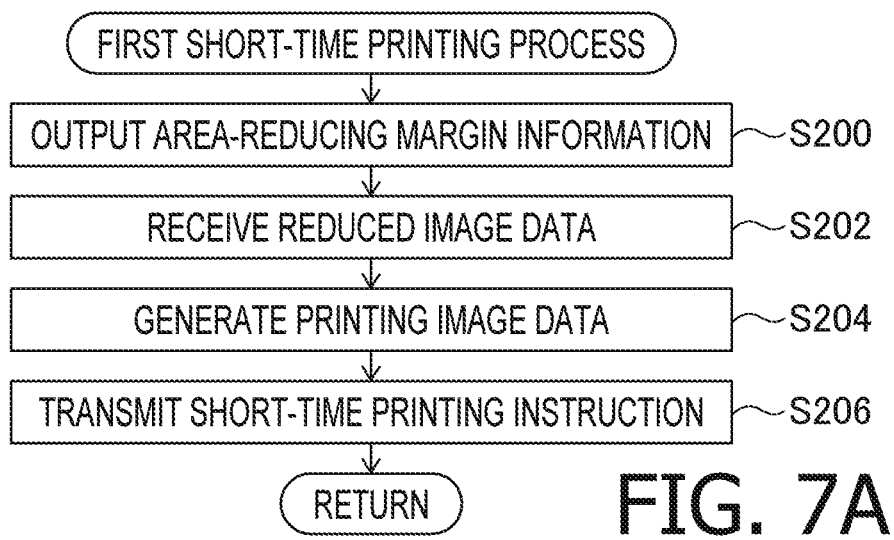

Thus, the printer driver 28 outputs the margin information (hereinafter, referred to as "area-reducing margin information") to define an area (hereinafter, referred to as a "reduced printable area") which is a reduced printable area 78 to the control program 26 through the OS 30 (FIG. 7A: S200). The reduced printable area 78 defined by the area-reducing margin information is set such that, as shown in FIGS. 3A and 3B, the reduced printable area 78 does not intrude into the side areas 72. Specifically, when the printing sheet 70 is conveyed in the portrait orientation as shown in FIG. 3A, since the portrait-orientation side areas 72A are both side areas in a direction perpendicular to the longitudinal direction of the printing sheet 70, the reduced printable area 78 is defined by reducing the normal printable area 76 only in the direction perpendicular to the longitudinal direction of the printing sheet 70. That is, the normal printable area 76 is reduced such that a length in a direction perpendicular to the longitudinal direction of the printing sheet 70 is shortened, while the length in the longitudinal direction of the printing sheet 70 is unchanged, thereby the reduced printable area 78 being defined. It is noted that the length of the reduced printable area 78 in the direction perpendicular to the longitudinal direction of the printing sheet 70 is defined to be equal to or slightly shorter than a length, in the direction perpendicular to the longitudinal direction of the printing sheet 70, between the portrait-orientation side areas 72A.

Further, when the printing sheet 70 is conveyed in the landscape orientation as shown in FIG. 39, the landscape-orientation side areas 72B are both end areas in the longitudinal direction of the printing sheet 70. Accordingly, the normal printable area 76 is reduced to be the reduced printable area 78 as reduced only in the longitudinal direction of the printing sheet 70. That is, the normal printable area 76 is reduced to the reduced printable area 78 such that the size of the normal printable area 76, in the longitudinal direction of the printing sheet 70, is reduced, while the size of the normal printable area 76 in the direction perpendicular to the longitudinal direction of the printing sheet 70 remains substantially unchanged. It is noted that the length of the reduced printable area 78, in the longitudinal direction of the printing sheet 70, is the same as or slightly shorter than the length, in the longitudinal direction of the printing sheet 70, between the landscape-orientation side areas 72B.

When the printer driver 28 outputs the margin information defining the reduced printable area 78, that is, the area-reducing margin information to the control program 26 through the OS 30, the control program 26 generates image data (hereinafter, referred to as reduced image data) which is used to print the image within the reduced printable area 78. Accordingly, when the printing process based on the reduced image data is performed, the image is printed only within the reduced printable area 78 as shown in FIG. 3A and FIG. 3B, but not printed within the side end areas 72A or 72B. As described above, as the printer driver 28, instead of the normal margin information, output the area-reducing margin information to the control program 26 through the OS 30, it becomes possible to prevent printing of images within the side areas 72A or 72B. Thus, according to the above configuration, the time period required for completing the printing process can be shortened without analyzing presence/absence of images to be printed on the side areas.

It is noted that a printing process avoiding printing on the side areas of the printing sheet 70 can be performed according to a method different form the above-described method.

Specifically, when the printer driver 28 outputs the normal margin information to the control program 26 through the OS 30 as described above, the control program 26 generates image data for printing an image within the normal printable area 76 (i.e., the normal image data). Thereafter, when the printer driver 28 receives the normal image data, the printer driver 28 generates the printing image data based on the received image data, and transmits the print instruction containing the thus generated printing image data to the printer. Unless a setting to expand/reduce an image is included, as the print setting, in the print instruction, the print instruction does not normally include an instruction to expand/reduce an image. Therefore, when receiving the print instruction from the printer driver 28, the printer performs the printing process of printing the image based on the printing image data contained in the print instruction without expanding/reducing the image. Therefore, the image printed in the printing process is, as shown in FIG. 2A or 2B, printed in the normal printable area 76 and therefore parts of the image may be printed within the side areas.

Then, the printer driver 28 receives the normal image data from the control program 26, generates the printing image data based on the normal image data, and adds a reduction command to the print instruction which includes the generated printing image data. The reduction command instructs reduced printing of an image at a particular reduction ratio. The particular reduction ratio is the same as a reduction ratio of a length of the reduced printable area 78 in a direction perpendicular to the conveying direction to a length of the normal printable area 76 in the direction perpendicular to the conveying direction. That is, when the printing sheet 70 is conveyed in the portrait-orientation, the particular ratio is a ratio of the length of the reduced printable area 78 in the direction perpendicular to the longitudinal direction of the printing sheet 70 to the length of the normal printable area 76 in the direction perpendicular to the longitudinal direction of the printing sheet 70. When the printing sheet 70 is conveyed in the landscape-orientation, the particular ratio is a ratio of the length in the longitudinal direction of the reduced printable area 78 to the length of the normal printable area 76 in the longitudinal direction of the printing sheet 70.

Figure 4:
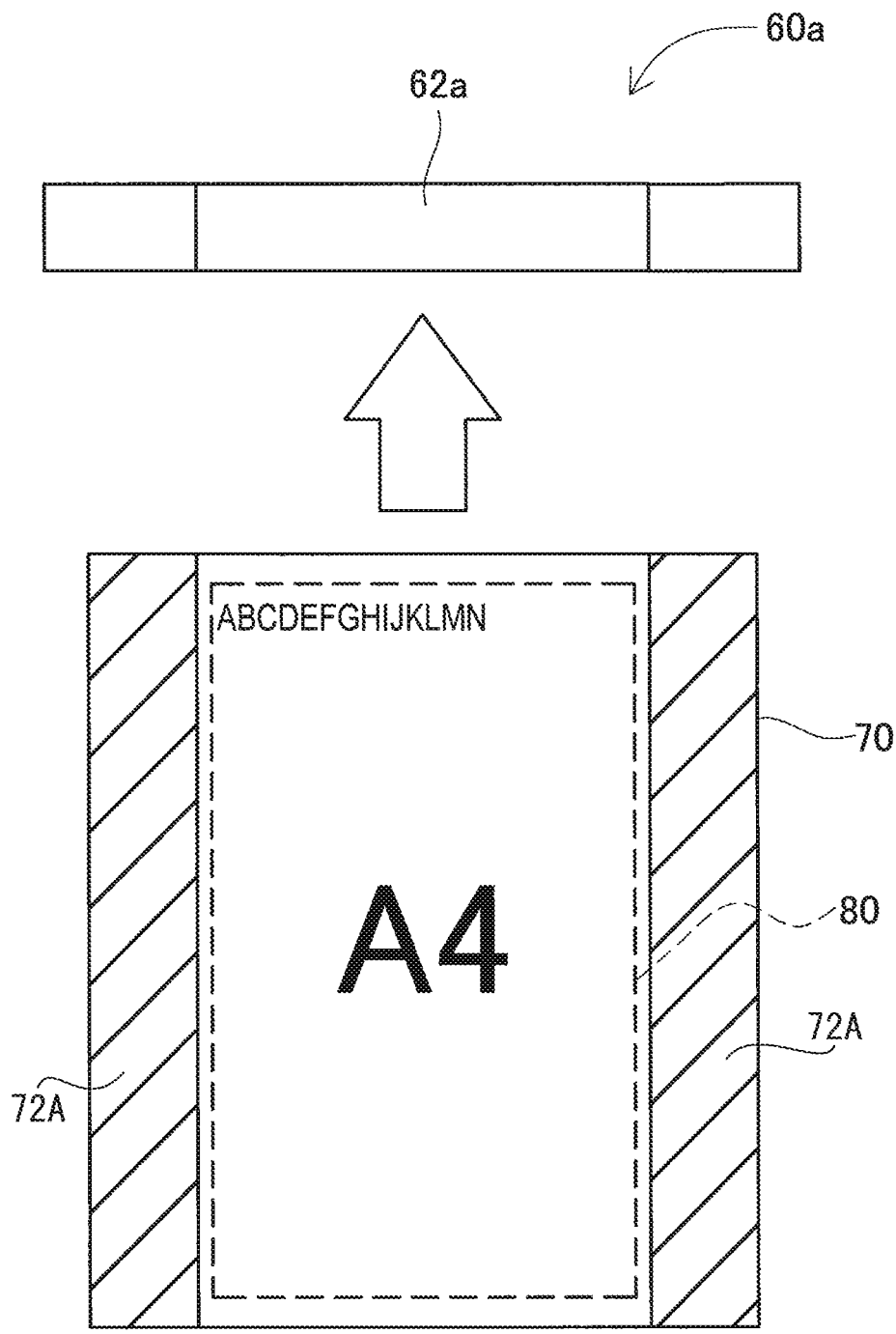
FIG. 4 shows a reduced printable area on the printing sheet.

When the print instruction, to which the reduction command is added, is transmitted to the printer (S216), the printer reduces the image based on the printing image data included in the print instruction and print the reduced image on the printing sheet 70 (i.e., the printer prints the image based on the printing image data in a reduced manner). As a result, as shown in FIG. 4, the image is printed only within an area smaller than the normal printable area 76, that is, only within an area (hereinafter, referred to as a "reduced printable area") 80 which is the area obtained by reducing the normal printable area 76 at the particular reduction ratio, while no images area printed on the side areas 72A. According to the above configuration, even if the printer driver 28 does not output the area-reducing margin information to the control program 26 instead of the normal margin information, simply by transmitting the print instruction added with the reduction command to the printer, it becomes possible to prevent images being printed on the side areas. As described above, according to a method of adding the reduction command to the print instruction, the time period required for performing the print process can be shortened without analyzing presence/absence of the images to be printed on the side areas 72.

According to the illustrative embodiment, the printer 54 is capable of performing the printing process with reducing the image in accordance with the reduction command, while the printer 50 or the printer 52 is not able to perform the printing process with reducing the image in accordance with the reduction command. Therefore, when the printer performing the printing process is the printer 54, the printer driver 28 transmits the print instruction added with the reduction command, while, when the printer performing the printing process is the printer 50 or the printer 52, the printer driver 28 outputs the area-reducing margin information to the control program 26 instead of the normal margin information.

On the other hand, there is a case where it is unnecessary to attempt to reduce the time period required for performing the printing process by printing the image within the reduced printable area 78 or 80 described above. According to the illustrative embodiment, the PC 10 stores a shortening condition for shortening the time period required for performing the printing process by printing images on the reduced printable area 78 or 80. When the shortening condition is satisfied, the printing process of printing images within the reduced printable area 78 or 80 is performed.

Firstly, there is a case where the user does not wish to shorten the time period required for performing the printing operation. In such a case, it is unnecessary to perform the printing process to print images within the reduced printable area 78 or 80. Accordingly, in such a case, on the PC 10, a selection screen is displayed on the LCD 16 as the printer driver 28 operates, and selection buttons to select a normal mode or a short-time mode are displayed on the selection screen. Only when the short-time mode is selected on the selection screen (S102: YES), the printing process of printing the image within the reduced printable area 78 or 80 is performed. When the normal mode is selected on the selection screen (S102: NO), the normal printing process is performed, which will be described later.

Further, each of the printers 50, 52 and 54 is configured to perform a secure printing process. When the secure printing process is performed, the printing process on the printer 50 (52 or 54) is performed after the print button is operated on the PC 10 and then the user operates a particular button of the printer 50 (52 or 54) to start printing in order to secure secrecy of printed matter. Therefore, when the secure printing process is performed, the fixing roller 60 is sufficiently heated by the heater 62 after the user operate the print button on the PC 10 till the user moves to the printer 50 (52 or 54) and operates the particular button of the printer 50 (52 or 54). Accordingly, when the secure printing process is performed (S104: NO), it is unnecessary to shorten the time period required for performing the printing process, and thus the normal printing process is performed. In contrast, when the printing process is one other than the secure printing process (S104: YES), the printing process of printing images within the reduced printable area 78 or 80 is performed.

When the user wants that the normal printing process is performed or when the printing process is the secure printing process, the printing process of the image within the reduced printable area 78 or 80 is not performed but the normal printing process is performed. Further, depending on the size or type of the printing sheet, the time period required for performing the printing process can be reduced without performing the printing process of the image within the reduced printable area 78 or 80.

Figure 5:
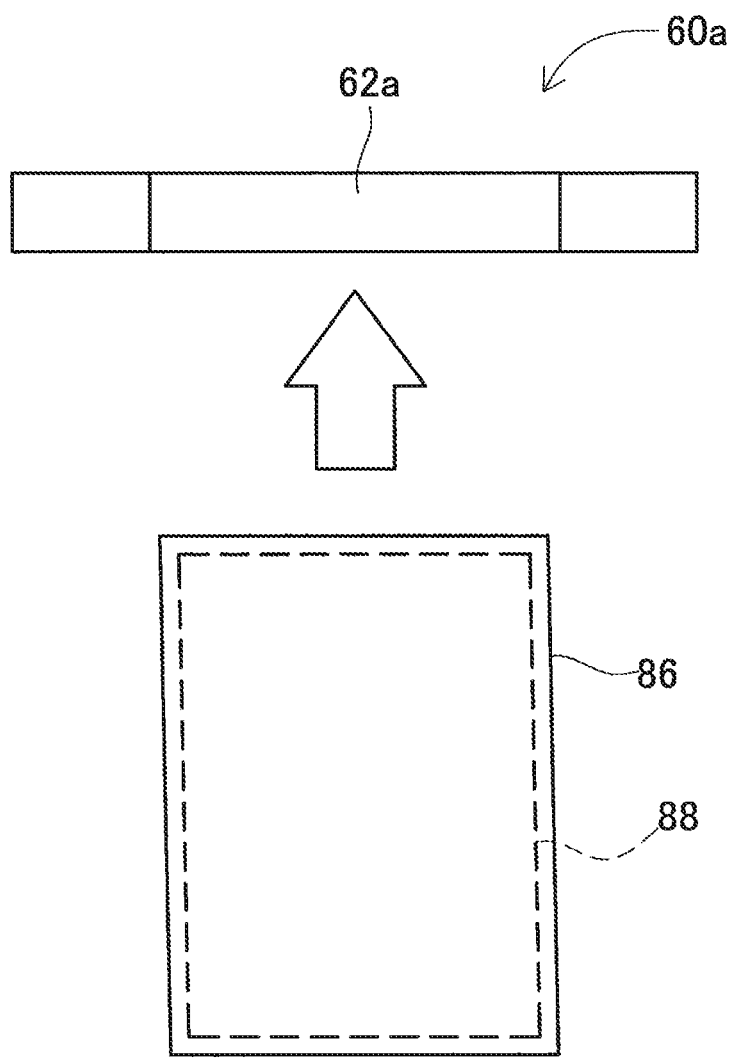
FIG. 5 shows a small-size printing sheet which is being conveyed.

Specifically, when the printing sheet is of A4 size, since the length of the printing sheet 70 in a direction perpendicular to the conveying direction of the printing sheet 70 is longer than the length of the heater 62 as shown in FIG. 2A or 2B, the printing process of the image within the reduced printable area 78 which is a reduced area of the normal printable area 76. On the other hand, when the size of the printing sheet is smaller than the A4 size (hereinafter, referred to as a small size) (e.g., an A5 size, an envelope size, a card size), the length of the printable area 88 of the printing sheet 86 in the direction perpendicular to the conveying direction is shorter than the length of the heater 62 as shown in FIG. 5. Therefore, the entire area of the printable area 88 of the printing sheet 86 can be heated by the heater 62. That is, the heater 62 can directly heat the printable area 88 of the printing sheet 86 over the entire length in the direction perpendicular to the conveying direction. Accordingly, when the printing sheet is of the small size (S106: NO), even in the printing process of the image within the normal printable area 76, a time period for necessary for performing the printing process can be shortened without reducing the normal printable area 76 to the reduced printable area 78. That is, the time period necessary for performing the printing process can be shortened without transmitting the area-reducing margin information to the control program 26 or without adding the reduction command to the print instruction.

Concretely, the printer driver 28 transmits the normal margin information to the control program 26 through the OS 30, and receives the normal image data from the control program 26. Next, the printer driver 28 generates the printing image data based on the normal image data, and transmits, to the printer, the print instruction containing the printing image data without adding the reduction command. Then, in the printer, after heating by the heater 62 is performed for a time period (Y second) shorter than the normal period, conveyance of the printing sheet 86 is started and the printing process is performed. As above, when printing within the printable area 88 is performed, it is possible to shorten a time period necessary to perform the printing process.

When the type of the printing sheet is thick sheets such as the glossy sheet, the label sheet and the like, or the printing sheet is the normal sheet (S108: YES), the printing sheet is hardly heated by the heater 62. Therefore, in order to avoid printing of the image on the side areas, the printing process to print an image within the reduced printable area 78, which is an area reducing the normal printable area 76. On the other hand, when the type of the printing sheet is the thin sheet such as a thin paper or the like (S108: NO), since the printing sheet 62 can be heated easily by the heater 62. Therefore, even if the printing sheet is not heated for a long period, the printing sheet is well heated to the side areas. Therefore, even if the type of the printing sheet is the thin sheet, similar to a case where the size of the printing sheet is the small size, the time period necessary for performing the printing process can be shortened even when the printing process for printing the image within the normal printable area 76 is performed.

Hereinafter, the processes according to the printer driver 28 described above will be described referring to flowcharts shown FIGS. 6, 7A and 7B. The processes shown in FIGS. 6, 7A and 7B are executed by the printer driver 28 in response to the image data of the image subject to be printed in the control program 26 being generated, and in response to a start button to start the printing process being operated after the printer which performs the printing process was selected.

Figure 6:
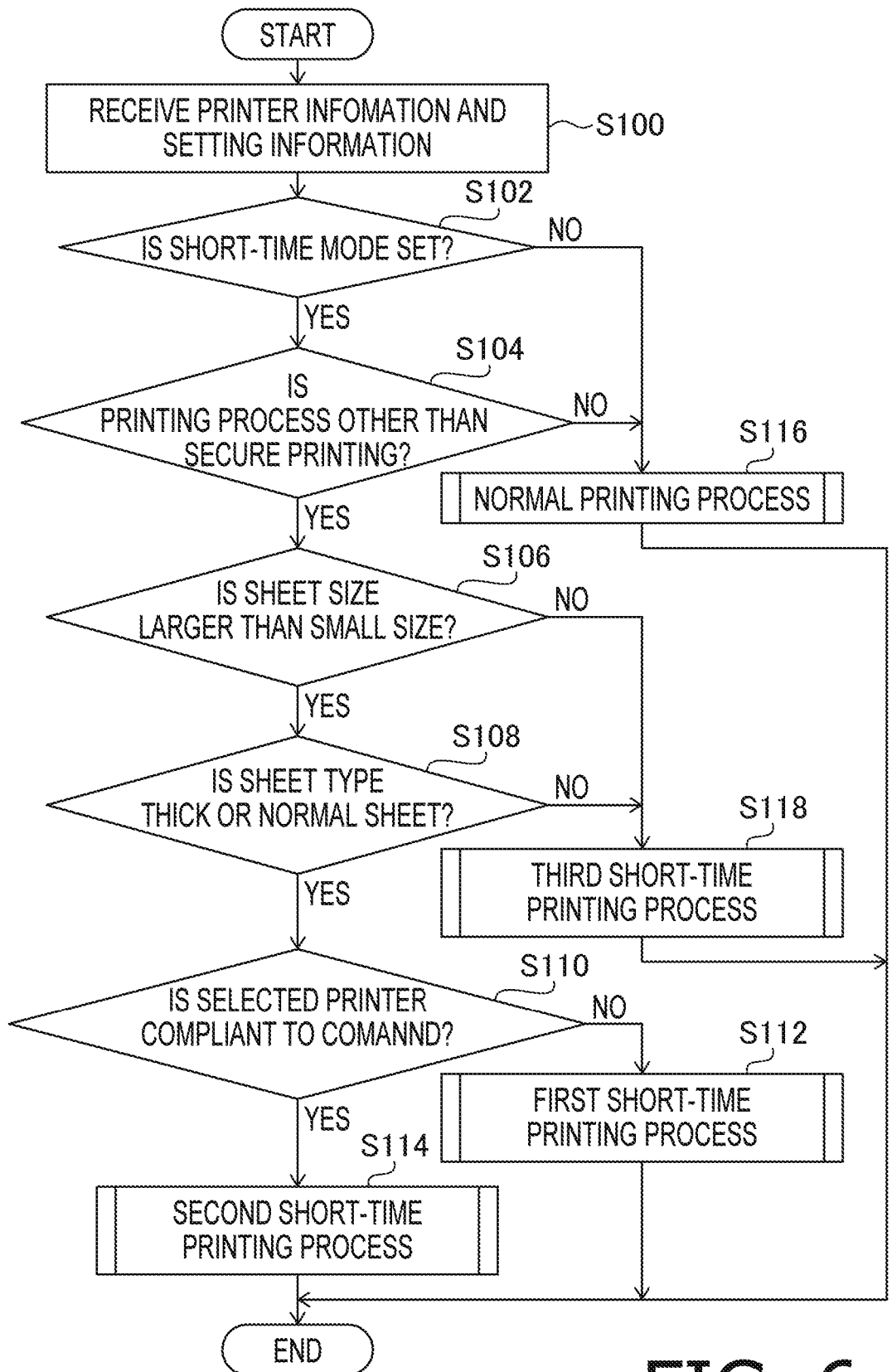
FIG. 6 shows a flowchart illustrating a process when a printer driver is executed.
Figure 7B:
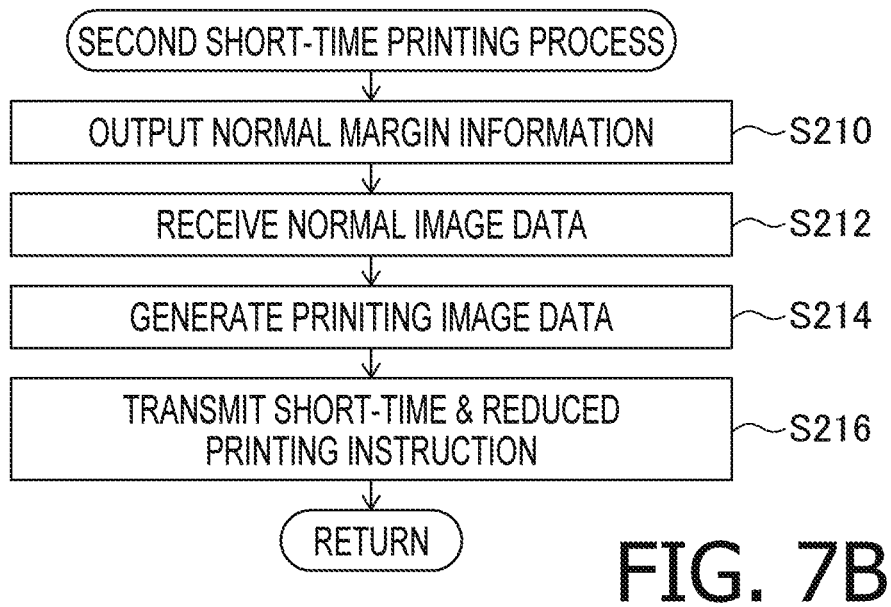
Figure 7C:
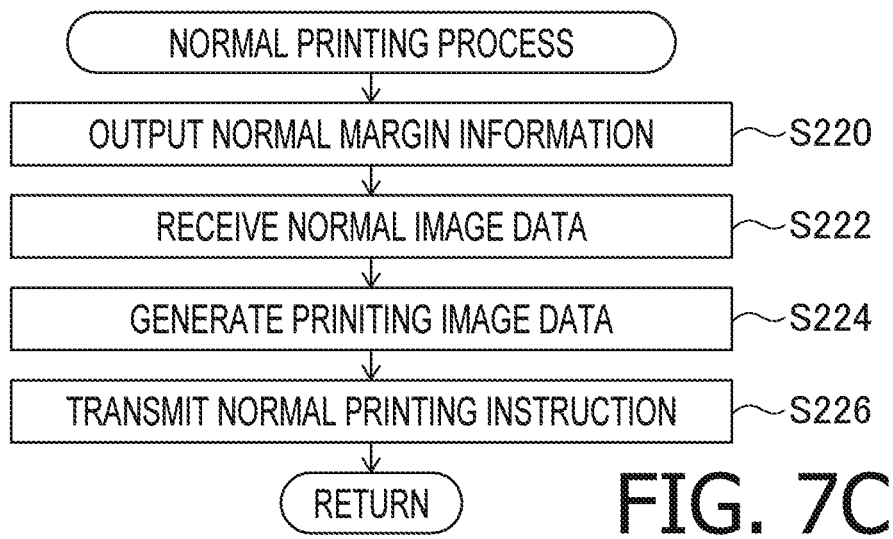
Figure 7D:
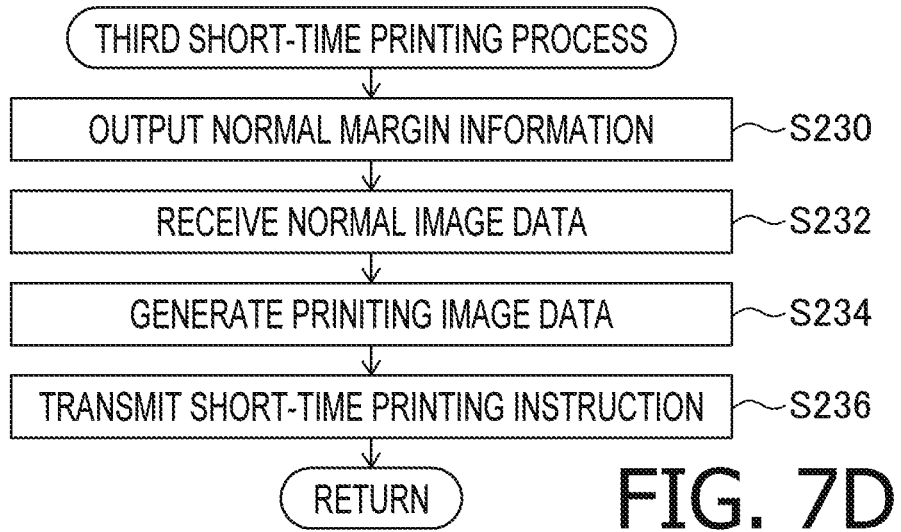

In FIG. 6, initially, the printer driver 28 receives, through the OS 30, printer information and setting information from the control program 26 (S100). The printer information is information regarding the selected printer (hereinafter, referred to a selected printer) by the control program 26. The printer information includes, for example, information indicating a model name of the selected printer, and information indicating a conveying direction of the printing sheet in the selected printer. That is, when the printer 50 is the selected printer, information indicating the model name of the printer 50 and information indicating that the printing sheet is conveyed in the portrait-orientation are included in the printer information. Further, the setting information includes information regarding printing mode (which is an example of print mode information), information indicating a size of the printing sheet (an example of printing medium information), and information indicating the type of the printing sheet (an example of printing medium information).

Next, the printer driver 28 determines whether the short-time mode is selected in the selection screen (S102). At this stage, when the short-time mode is selected (S102: YES), the printer driver 28 determines, in S104, whether the printing process is a printing process other than the secure printing process (S104) based on the information regarding the printing process included in the setting information received in S100. When the printing process is a process other than the secure printing process (S104: YES), the printer driver 28 determines whether the printing sheet is larger than the small size (S106) based on the information indicating the size of the printing sheet included in the setting information received in S100. That is, whether the printing sheet is of the size other than the small size (i.e., equal to or larger than the A4 size).

When the sheet size is one other than the small size (S106: YES), the printer driver 28 deter mines whether or not the type of the printing sheet is the thick sheet or the normal sheet (S108) based on the information indicating the type of the printing sheet included in the setting information received in S100. When the printing sheet is the thick sheet or the normal sheet (S108: YES), the printer driver 28 determines whether or not the selected printer is configured to perform the printing process corresponding to the reduction command (hereinafter, such a printer will be referred to as "command-compliant printer"), that is, the printer 54 (S110).

When the selected printer is not the command-compliant printer (S110: NO), that is, the selected printer is the printer 50 or 52, a first short-time printing process (S112). In the first short-time printing process, the printer driver 28 outputs the area-reducing margin information to the control program 26 through the OS 30 (S200). At this stage, when the information indicating the model name included in the printer information which was received in S100 indicates the printer 50, the area-reducing margin information defining the reduced printable area (see FIG. 3A) of the printing sheet 70 which is conveyed in the portrait-orientation is output. On the other hand, when the information indicating the model name included in the printer information which was received in S100 indicates the printer 52, the area-reducing margin information defining the reduced printable area (see FIG. 39) of the printing sheet 70 which is conveyed in the landscape-orientation is output.

Next, the printer driver 28 receives the reduced image data from the control program 26 through the OS 30 (S202)

in response to the printer driver 28 being output. Next, the printer driver 28 generates the printing image data based on the received reduced image data (S204). Then, the printer driver 28 adds a command to supply the printing sheet earlier (hereinafter, such a command will be referred to as an "early conveyance starting command"), that is, a command to start conveyance of the printing sheet is added to the print instruction after the fixing roller 60 is heated by the heater 62 for Y seconds, and transmits the print instruction containing the printing image data to the selected printer (S206). After execution of S206, the first short-time printing process is terminated. Then, control returns to the main routine.

When it is determined that the selected printer is the command-compliant printer (S110: YES), that is, when the selected printer is the printer 54, a second short-time printing process is performed (S114). In the second short-time printing process, the printer driver 28 outputs the normal margin information to the control program 26 through the OS 30 (S210). Next, the printer driver 28 receives the normal image data from the control program 26 through the control program 26 in response to output of the normal margin information (S212). Next, the printer driver 28 generates the printing image data based on the received normal image data (S214). Then, the printer driver 28 adds the early conveyance starting command and the reduction command to the print instruction, and transmits the print instruction containing the printing image data to the selected printer (S216). Then, control terminates the second short-time printing process and returns to the main routine.

When it is determined that the short-time mode is not selected (S102: NO), that is, when the normal mode is selected or when it is determined that the printing process is the secure printing process (S104: NO), the normal printing process is performed (S116). In the normal printing process, the printer driver 28 outputs the normal margin information to the control program 26 through the OS 30 (S220). Next, in response to the normal margin information being output, the printer driver 28 receives the normal image data from the control program 26 through the OS 30 (S222). Next, the printer driver 28 generates the printing image data based on the received normal image data (S224). Then, the printer driver 28 transmits the print instruction containing the printing image data to the selected printer (S226). Then, control terminates the normal printing process and returns to the main routine.

When it is determined that the sheet size is the small size (S106: NO), or when it is determined that the printing sheet is not the thick type sheet or the normal type sheet (S108: NO), that is, the printing sheet is the thin type sheet, a third short-time printing process is performed (S118). In the third short-time printing process, the printer driver 28 outputs the normal margin information to the control program 26 through the OS 30 (S230). Next, in response to the normal margin information being output, the printer driver 28 receives the normal image data from the control program 26 through the OS 30 (S232). Next, the printer driver 28 generates the printing image data based on the received normal image data (S234). Then, the printer driver 28 adds the early conveyance start command to the print instruction and transmits the print instruction containing the printing image data to the selected printer (S236). Then, control terminates the third short-time printing process and returns to the main routine.

It is noted that S100 executed by the CPU 12 is an example of a second obtaining process, a third obtaining process and a fourth obtaining process. S200, S216, S220, S226, S230 or S236 is an example of an outputting process.

S204 executed by the CPU 12 is an example of a first generating process. S206 executed by the CPU 12 is an example of a first transmitting process. S210 executed by the CPU 12 is an example of a requesting process. S214 executed by the CPU 12 is an example of a second generating process. S216 executed by the CPU 12 is an example of a second transmitting process.

<Effects of the Embodiment>

According to the above-described embodiment, the following effects can be obtained.

In the PC 10, when the above-described shortening condition is satisfied, the printing process of printing images within the reduced printable area 78 or 80 which is the reduced area of the normal printable area 76 is performed. According to such a configuration, the time period necessary for performing the printing process can be shortened effectively.

In order to perform the printing operation to print an image within the reduce printable area 78, the printer driver 28 outputs the area-reducing margin information, instead of the normal margin information, to the control program 26 through the OS 30. According to such a configuration, the printer driver 28 can obtain the image data which can be printed within the reduced printable area 78, that is, the reduced image data from the control program 26. Therefore, according to such a configuration, the printing process of printing an image within the reduced printable area 78 can be performed appropriately.

In order to perform the printing process of printing an image within the reduced printable area 80, the printer driver 28 adds the reduction command to the print instruction, and transmits the print instruction to the selected printer. According to such a configuration, as the selected printer prints the image in a reduced manner. Thus, the printing process of printing an image within the reduced printable area 80 can be performed appropriately.

When the short-time mode is selected on the selection screen, the printing process of printing an image on the reduced printable area 78 or 80 is performed. Therefore, printing of the image on the reduced printable area 78 or 80 can be performed reflecting the user's intension.

When the printing process is one other than the secure printing process, the printing process of printing the image within the reduced printable area 78 or 80 is performed. According to such a configuration, when it is unnecessary to shorten the time period necessary for performing the printing operation, the printing process of printing an image within the reduced printable area 78 or 80 is not performed, but the normal printing process can be performed.

When the size of the printing sheet is one other than the small size, the printing process of printing an image within the reduced printable area 78 or 80 is performed. According to such a configuration, only when it is difficult to heat the side areas of the printing sheet, the printing process of printing an image within the reduced printable area 78 or 80 is performed.

When the type of the printing sheet is one other than the thin type, the printing process of printing an image within the reduced printable area 78 or 80 is performed. According to such a configuration, only when the printing sheet is of a type which cannot be heated easily, the printing process of printing an image within the reduced printable area is performed.

When the selected printer is the command-compliant printer, the printer driver 28 transmits the print instruction to which the reduction command is added to the selected printer. When the selected printer is not the command-compliant printer, the printer driver 28 outputs, instead of the normal margin information, the area-reducing margin information to the control program 26 through the OS 30. With the above-described configuration, the printing process of the image within the reduced printable area 78 or 80 can be appropriately performed in accordance with the type of the selected printer.

It is noted that aspects of the present disclosures should not be limited to the configurations described above, but can be embodied with various modifications and/or improvement based on knowledge of person skilled in the art. For example, according to the above-described embodiment, the printer driver 28 outputs the normal margin information, and when receiving the normal image data, the printer driver 28 transmits the print instruction to which the reduction command is added to the selected printer. Then, the selected printer performs the printing process with reducing the image. The above-described configuration may be modified such that the printer driver 28 may be configured to generate the printing image data representing the reduced image and transmit the printing image data to the selected printer. That is, when the printer driver 28 outputs the normal margin information and obtains the normal image data, the printer driver 28 may generate the printing image data representing an image which has been reduced so as to be printed within the reduced printable area 80. Then, as the printer driver 28 transmits the printing image data to the selected printer, the printing process of printing the image within the reduced printable area may be performed.

According to the above-described embodiment, when the selected printer is not the command-compliant printer, as the printer driver 28 outputs, instead of the normal margin information, the area-reducing margin information to the control program 26, the printing process of printing an image within the reduced printable area 78 is performed. However, in the above case, the normal printing process may be performed. That is, when the selected printer is the command-compliant printer, the printing process of printing an image within the reduced printable area 78 is performed, while, when the selected printer is not the command-compliant printer, the normal printing process may be performed.

In the above-described embodiment, areas at both end portions of the printing sheet are referred to as the side areas. However, only one of both ends portions of the printing sheet may be referred to as the side area. That is, when the heater 62 is not arranged at the central part of the heating roller 60 but arranged to be biased rightward or leftward, a left side or a right side area of the fixing roller 60 may be heated less easily than the other side. Therefore, in such a case, the printing process may be performed such that the normal printable area 76 may be reduced so as to exclude a portion of the printing sheet to which the heat and pressure is applied by the left or right side part of the heating roller 60 which is heated less easily than the other side part. It should be noted that, not only the end portion(s) of the printing sheet but a portion other than the end portions (e.g., a central portion) may be treated similarly to the side areas as described above. For example, when the heater 62 and the fixing roller 60 are configured such that the central part of the heater 60 is less easily to be heated than the side parts, the normal printable area 76 may be reduced to exclude the area of the printing sheet to which the heat and the pressure is applied by the central part of the fixing roller 60, and the printing process is performed with respect to the thus defined reduced printable area.

Further, in the above-described embodiment, the heater 62 is arranged at the central portion of the fixing roller 60 but is not extended to the ends of the fixing roller 60. However, the heater 62 may be configured to extend to both ends of the fixing roller 60. That is, the heater 62 is configured to be arranged over the entire area, of the fixing roller 60, that contacts the printing sheet to apply the heat and pressure at the time of fixing. Even when the heater 62 is arranged to extend over the entire area of the fixing roller 60, both end portions of the fixing roller 60 are still less easily heated in comparison with the central portion, and the aspects of the present disclosure are applicable.

In the above described embodiment, the printer driver 28 determines whether or not the shortening condition is satisfied. This configuration may be modified such that, for example, the control program 26 determines whether or not the shortening condition is satisfied. In such a case, when the control program 26 determines that the shortening condition is satisfied, the control program 26 may output the reduced image data to the printer driver 28, while, when the control program 26 determines that the shortening condition is not satisfied, the control program 26 may transmit the normal image data to the printer driver 28. That is, the control program 26 may execute the processes of S100-S110. In such a case, the printer driver 28 may execute the processes of S202-S206 and S222-S226.

Further, when the control program 26 generates the printing image data and transmits the same to the selected printer, if the control program 26 determines that the shortening condition is satisfied, the control program 26 may transmit the print instruction to which the reduction command is added, while, if the control program 26 determines that the shortening condition is not satisfied, the control program 26 may transmits the print instruction to which the reduction command is not added to the selected printer. That is, the control program 26 may performs the processes of S100-S110, S214, S216, S224 and S226. In this case, the printer driver 28 may not be used.

It is noted that the OS 30 may performs processes similar to those performed by the printer driver 28. That is, the OS 30 may determine whether or not the shortening condition is satisfied, and output the area-reducing margin information to the control program 26 when the OS 30 determines that the shortening condition is satisfied, while the OS 30 may output the normal margin information to the control program 26 when the OS 30 determines that the shortening condition is not satisfied.

When the OS 30 generates the printing image data and transmits the same to the selected printer, if the OS 30 determines that the shortening condition is satisfied, the OS 30 may transmit the print instruction to which the reduction command is added to the selected printer, while, if the OS 30 determines that the shortening condition is not satisfied, the OS 30 may transmit the print instruction to which the reduction command is not added to the selected printer. In such a case, the OS 30 performs the processes of S100-S236.

In the above-described embodiment, a laser printer is employed as the printer. However, the aspects of the present disclosures need not be limited to the laser printer but printers in accordance with other printing methods (e.g. an electrophotographic printer such as an LED printer) may be employed as the printer.

In the above-described embodiment, the processes shown in FIGS. 6, 7A, 7B, 7C and 7D are performed by the CPU 12. It is noted that the processes may be performed by an ASIC or other logical circuits instead of the CPU 12.

Alternatively, the processes may be executed by the CPU, the ASIC and other logical circuits in an associated manner.

What is claimed is:

1. A non-transitory computer-readable recording medium storing computer-executable instructions, which constitute a particular program, for a terminal device having an input and a processor,
wherein the instructions cause, when executed by the processor, the terminal device to perform:
a first obtaining process of obtaining printable area information indicating a normal printable area, by a printer connected with the input, on a printing medium loaded to the printer;
a command outputting process of outputting a command instructing printing of a first image on the printing medium loaded to the printer connected with the input;
a condition determining process of determining whether a shortening condition is satisfied, transmission of a command to perform a short-time printing process to the printer connected with the input being permitted when the shortening condition is satisfied, the short-time printing process being a printing process in which a time period from receiving a print instruction to starting a conveyance of a printing sheet is shorter than a normal printing process,
wherein, when it is determined that the shortening condition is not satisfied, the processor outputs, in the command outputting process, a first command, the first command causing the printer to print the first image within the normal printable area, on the printing medium, indicated by the printable area information obtained in the first obtaining process, and
wherein, when it is determined that the shortening condition is satisfied, the processor outputs a second command, the second command including the instruction to perform the short-time printing process transmitted from the terminal device to the printer and causing the printer to print the first image within a reduced area on the printing medium, the reduced area being smaller than the normal printable area indicated by the printable area information obtained in the first obtaining process.

2. The non-transitory computer-readable recording medium according to claim 1,
wherein, when a user operation corresponding to shortening of the time period necessary to complete the printing process performed by the printer is not received through a user interface of the terminal device:
the processor determines, in the condition determining process, that the shortening condition is not satisfied; and
the processor outputs the first command in the command outputting process, and
wherein, when the user operation corresponding to shortening of the time period necessary to complete the printing process performed by the printer is received through the user interface of the terminal device:
the processor determines, in the condition determining process, that the shortening condition is satisfied; and
the processor outputs the second command in the command outputting process.

3. The non-transitory computer-readable recording medium according to claim 1,
wherein the instructions further cause, when executed by the processor, the terminal device to perform a second obtaining process of obtaining printing medium information indicating a characteristic of the printing medium on which the first image is to be printed,
wherein, when the printing medium information obtained in the second obtaining process indicates a first characteristic:
the processor determines, in the condition determining process, that the shortening condition is satisfied; and
the processor outputs, in the command outputting process, the second command, and
wherein, when the printing medium information obtained in the second obtaining process indicates a second characteristic which is different from the first characteristic:
the processor determines, in the condition determining process, that the shortening condition is not satisfied; and
the processor outputs, in the command outputting process, the first command.

4. The non-transitory computer-readable recording medium according to claim 1,
wherein the instructions further cause, when executed by the processor, the terminal device to perform a third obtaining process of obtaining printing mode information indicating in what print mode the first image is to be printed on the printing medium,
wherein, when the shortening condition includes a condition in which the printing mode information obtained in the third obtaining process and indicting a first mode:
the processor determines, in the condition determining process, that the shortening condition is satisfied; and
the processor outputs, in the command outputting process, the second command, and
wherein, when the shortening condition includes a condition in which the printing medium information obtained in the second obtaining process and indicating a second mode which is different from the first mode:
the processor determines, in the condition determining process, that the shortening condition is not satisfied; and
the processor outputs, in the command outputting process, the first command.

5. The non-transitory computer-readable recording medium according to claim 1,
wherein the instructions further cause, when executed by the processor, the terminal device to perform a fourth obtaining process of obtaining printer information indicating a characteristic of a printer to print the first image,
wherein, when the shortening condition includes a condition in which the printing medium information obtained in the fourth obtaining process and indicting a first characteristic:
the processor determines, in the condition determining process, that the shortening condition is satisfied; and
the processor outputs, in the command outputting process, the second command, and
wherein, when the shortening condition includes a condition in which the printing medium information obtained in the fourth obtaining process and indicating a second characteristic which is different from the first characteristic:
the processor determines, in the condition determining process, that the shortening condition is not satisfied; and the processor outputs, in the command outputting process, the first command.

6. The non-transitory computer-readable medium according to claim 1,
wherein, in the command outputting process:
when the shortening condition is not satisfied, the processor outputs a command requesting for a first image having a size which can be settled within the normal printable area to an external program which is different from the particular program as the first command; and
when the shortening condition is satisfied, the processor outputs a command requesting for the first image having a size which can be settled within an area smaller than the normal printable area to the external program as the second command,
wherein the instructions further cause, when executed, the terminal device to perform:
in response to output of a command in the outputting process, a first generating process of obtaining image data of the first image from the external program and generating printing image data based on the obtained image data; and
a first transmitting process of transmitting a print instruction of the image indicated by printing image data generated in the first generating process to the printer through the input.

7. The non-transitory computer-readable medium according to claim 1,
wherein the instructions further cause, when executed, the terminal device to perform:
a requesting process of requesting an external program, which is a program different from the particular program, for a first image having a size which can be settled within the normal printable area; and
in response to a request in the requesting process, a second generating process of obtaining image data of the first image and generating printing image data based on the obtained image data,
wherein, in the command outputting process:
when the shortening condition is not satisfied, the processor outputs a command instructing printing of an image indicating the printing image data generated in the second generating process within the normal printable area of the printing medium to the printer as the first command; and
when the shortening condition is satisfied, the processor outputs a command instructing printing of an image indicating the printing image data generated in the second generating process in a reduced manner within an area smaller than the normal printable area of the printing medium to the printer as the second command.

8. The non-transitory computer-readable recording medium according to claim 1,
wherein the instructions further cause, when executed, the terminal device to perform a fourth obtaining process of obtaining printer information indicating a characteristic of a printer which is to print the first image,
wherein, when the printer information obtained in the fourth obtaining process indicates a first characteristic, the instructions further cause, when executed, the terminal device to perform:
a requesting process of requesting an external program which is different from the program for a first image having a size which can be settled within the normal printable area, and
in response to a request in the requesting process, a second generating process of obtaining image data of the first image from the external program and generating the printing image data based on the obtained image data,
wherein, when it is determined that the shortening condition is not satisfied, the processor outputs, in the command outputting process, a command instructing printing of an image indicating the printing image data generated in the second generating process within the normal printable area of the printing medium to the printer as the first command, and
wherein, when it is determined that the shortening condition is satisfied, the processor outputs, in the command outputting process, a command instructing printing of an image indicating the printing image data generated in the second generating process in a reduced manner within an area smaller than the normal printable area of the printing medium to the printer as the second command,
wherein, when the printer information obtained in the fourth obtaining process indicates a second characteristic different from the first characteristic:
when it is determined that the shortening condition is not satisfied, the processor outputs, in the command outputting process, a command requesting for a first image which can be settled within the normal printable area to an external program which is different from the particular program as the first command; and
when it is determined that the shortening condition is satisfied, the processor outputs, in the command outputting process, a command requesting for the first image which can be settled within an area smaller than the normal printable area to an external program which is different form the particular program as the second command, and
wherein the instructions further cause, when executed, the terminal device to perform:
a first generating process of obtaining image data of the first image corresponding to the command output in the command outputting process and generates the printing image data based on the obtained image data; and
a first transmitting process of transmitting a print instruction to print an image represented by the printing image data generated in the first generating process to the printer through the input.

9. The non-transitory computer-readable recording medium according to claim 1,
wherein, the printer connected with the input is an electrophotographic printer having a heating section which is shorter than the normal printable area in the axial direction used for heating the printing medium, and
wherein a time period for heating by the heating section is shorter in the short-time printing process than in the normal printing process.

10. A terminal device, comprising
an input; and
a processor,
wherein, in accordance with a particular program, the processor is configured to perform:
a first obtaining process of obtaining printable area information indicating a normal printable area, by a printer connected with the input, on a printing medium loaded to the printer;

a command outputting process of outputting a command instructing printing of a first image on the printing medium loaded to the printer; and a condition determining process of determining whether a shortening condition is satisfied, transmission of a command to perform a short-time printing process to the printer connected with the input being permitted when the shortening condition is satisfied, the short-time printing process being a printing process in which a time period from receiving a print instruction to starting a conveyance of a printing sheet is shorter than a normal printing process, wherein, when it is determined that the shortening condition is not satisfied, the processor outputs, in the command outputting process, a first command, the first command causing the printer to print the first image within a normal printable area, on the printing medium, indicated by the printable area information obtained in the first obtaining process, and wherein, when it is determined that the shortening condition is satisfied, the processor outputs, in the command outputting process, a second command, the second command the second command including the instruction to perform the short-time printing process to be transmitted from the terminal device to the printer and causing the printer to print the first image within a reduced area on the printing medium, the reduced area being smaller than the normal printable area indicated by the printable area information obtained in the first obtaining process.

11. A communication system, comprising:
a terminal device; and
a printer,
the terminal device including an input and a processor,
the printer being connected with the input,
wherein, in accordance with a particular program, the processor is configured to perform:
a first obtaining process of obtaining printable area information indicating a printable area, by the printer, on a printing medium loaded to the printer;
a command outputting process of outputting a command instructing printing of a first image on the printing medium loaded to the printer; and
a condition determining process of determining whether a shortening condition is satisfied, transmission of a command to perform a short-time printing process to the printer connected with the input being permitted when the shortening condition is satisfied, the short-time printing process being a printing process in which a time period from receiving a print instruction to starting a conveyance of a printing sheet is shorter than a normal printing process, wherein, when it is determined that the shortening condition is not satisfied, the processor outputs, in the command outputting process, a command requesting for a first image having a size which can be settled within the printable area indicated by the printable area information obtained in the first obtaining process to the particular program as the first command, and wherein, when the shortening condition is satisfied, the processor outputs, in the command outputting process, a command including the instruction to perform the short-time printing process to be transmitted from the terminal device to the printer and requesting for the first image having a size which can be settled within an area smaller than the printable area to the external program as the second command, and wherein the processor is further configured to perform:
a first generating process of obtaining image data of the first image corresponding to the command output in the command outputting process and generates the printing image data based on the obtained image data; and
a first transmitting process of transmitting a print instruction to print an image represented by the printing image data generated in the first generating process to the printer through the input.

12. A communication system, comprising:
a terminal device; and
a printer,
the terminal device including an input and a processor,
the printer being connected with the input,
wherein the processor is configured to perform:
a first obtaining process of obtaining printable area information indicating a printable area, by the printer, on a printing medium loaded to the printer;
a requesting process of requesting an application for a first image to be printed on the recording medium and having a size which can be settled within the printable area indicated by the printable area information obtained in the first obtaining process;
in response to a request in the requesting process, a second generating process of obtaining image data of the first image from the application and generating the printing image data based on the obtained image data; and
a second transmitting process of transmitting a command instructing printing of an image represented by the printing image data generated in the second generating process to the printer through the input,
wherein, in the second transmitting process:
when the shortening condition regarding shortening of a time period necessary to complete a printing process by the printer is not satisfied, the processor transmits a first command instructing printing of an image represented by the printing image data generated in the second generating process within the printable area on the printing medium to the printer through the input; and
when the shortening condition is satisfied, the processor transmits a second command, the short-time printing process being a printing process in which a time period from receiving a print instruction to starting a conveyance of a printing sheet is shorter than a normal printing process, and the second command including the instruction to perform the short-time printing process transmitted from the terminal device to the printer and instructing printing of an image represented by the printing image data generated in the second generating process, in a reduced manner, within an area smaller than the printable area on the printing medium to the printer through the input.

* * * * *